Feb. 6, 1968 H. R. PRATT ET AL 3,367,492
INSULATION SYSTEM
Filed Sept. 3, 1964 2 Sheets-Sheet 1

*INVENTORS*
HAROLD R. PRATT
CHARLES D. FORMAN
AUGUSTUS B. SMALL
JOHN F. REEVES

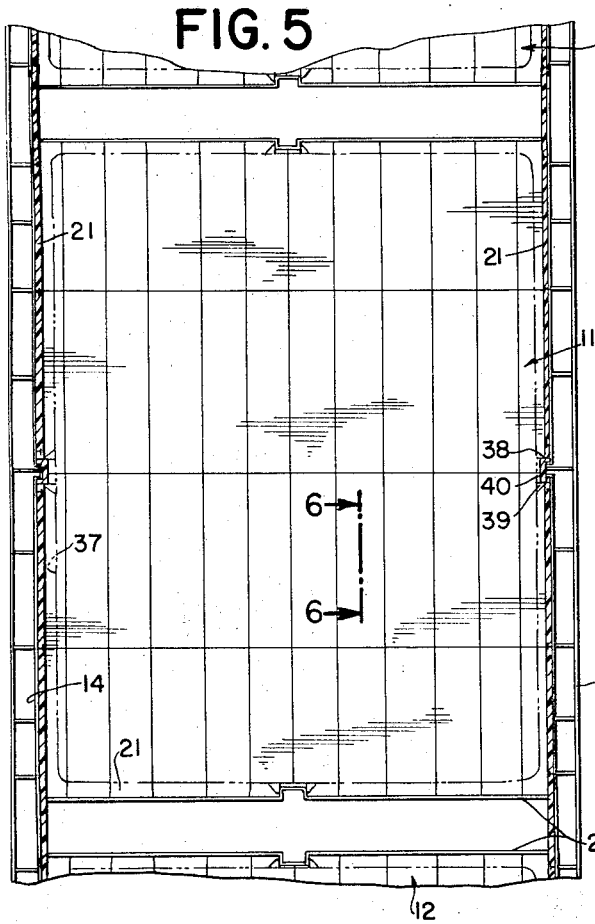
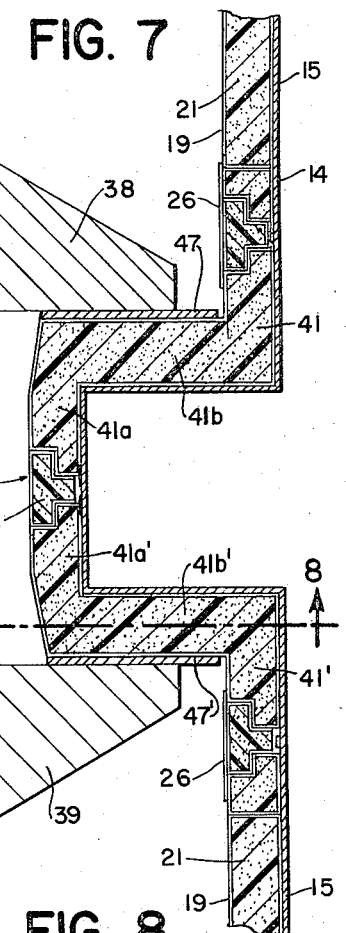
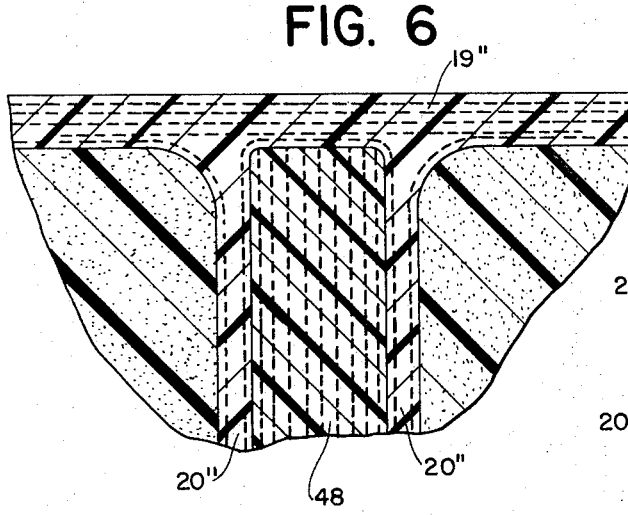
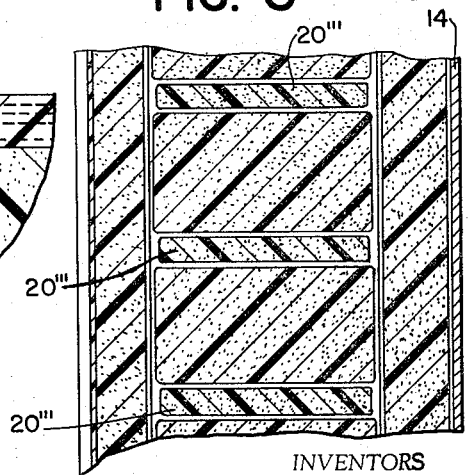
INVENTORS
HAROLD R. PRATT
CHARLES D. FORMAN
AUGUSTUS B. SMALL
JOHN F. REEVES United States Patent Office 3,367,492
Patented Feb. 6, 1968

3,367,492
INSULATION SYSTEM
Harold R. Pratt, Ridgewood, Charles D. Forman, Elizabeth, and Augustus B. Small, Westfield, N.J., and John F. Reeves, Milwaukee, Wis., assignors to Esso Research and Engineering Company, a corporation of Delaware
Filed Sept. 3, 1964, Ser. No. 394,287
8 Claims. (Cl. 220—9)

ABSTRACT OF THE DISCLOSURE

The cryogenic insulation system of the instant disclosure utilizes a plurality of sandwich-type insulating panels. A most salient feature of the disclosed system comprises the manner in which the cold face (i.e., the layer exposed to cryogenic temperatures) of the system is secured to prevent shifting of said face under the stresses caused by the contraction tendencies present at the envisioned operational temperatures. Thus, the teachings of the disclosure allow the construction of a cryogenic insulating system which is free of expansion joints.

---

This invention relates generally to insulation systems and specifically to an insulation system for the storage of various liquids throughout a broad range of temperatures.

According to the present invention, an integrated insulation system is disclosed comprising a series of insulation units of generally laminar construction, including means for affixing said units within a vessel or ship. The system has immediate and specific application for transporting liquefied hydrocarbons at cryogenic temperatures and shall be discussed primarily in this respect. It is known that such systems exist per se. However, the present arrangement possesses certain distinct advantages over those presently known. A most salient and unique feature of the disclosed system comprises the manner in which the cold face (in the case of materials at cryogenic temperatures) or layer exposed to cryogenic temperatures is secured to prevent shifting of such face under the stresses caused by contraction at extremely low temperatures. The cold face is bonded preferably to a plastic insulation layer and the latter as a consequence is prevented from shrinking or shifting, which avoids fracturing of the insulation layer and destruction of its insulating properties. Various other features of the integrated system will appear.

The following description relates to a particular embodiment of the invention as shown in the drawings in which:

FIG. 5 is a plan view of the overall insulation system showing in its entirety a central hold and adjacent thereto, fragmentary portions of similar holds, each containing the insulation system of the invention;

FIG. 6 is a fragmentary cross section of the bottom portion of the hold of FIG. 5 taken in the direction of arrows 6—6; and FIGS. 7 and 8 are respective details of a keyway construction included in the integrated insulation system.

Figure 1:
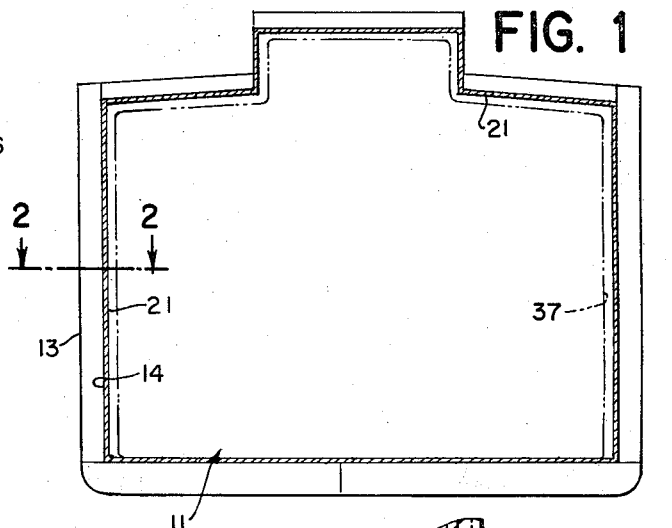
FIG. 1 is a schematic cross sectional view of a portion of a tanker vessel containing the insulation system of the invention.

Referring initially to FIGS. 1 and 5, in accordance with the invention, a tanker vessel will be constructed having a series of cargo compartments or holds 10, 11, and 12, extending longitudinally of the vessel. The outer hull of the vessel has been indicated at 13 and, as is conventional in vessels transporting liquefied gases at cryogenic temperatures, the vessel has a second or inner hull 14 and transverse bulkheads 25 intermediate the cargo compartments 10 to 12. Immediately adjacent to the inner hull 14 is the integrated insulation system of the present invention which shall now be described in detail.

Figure 2:
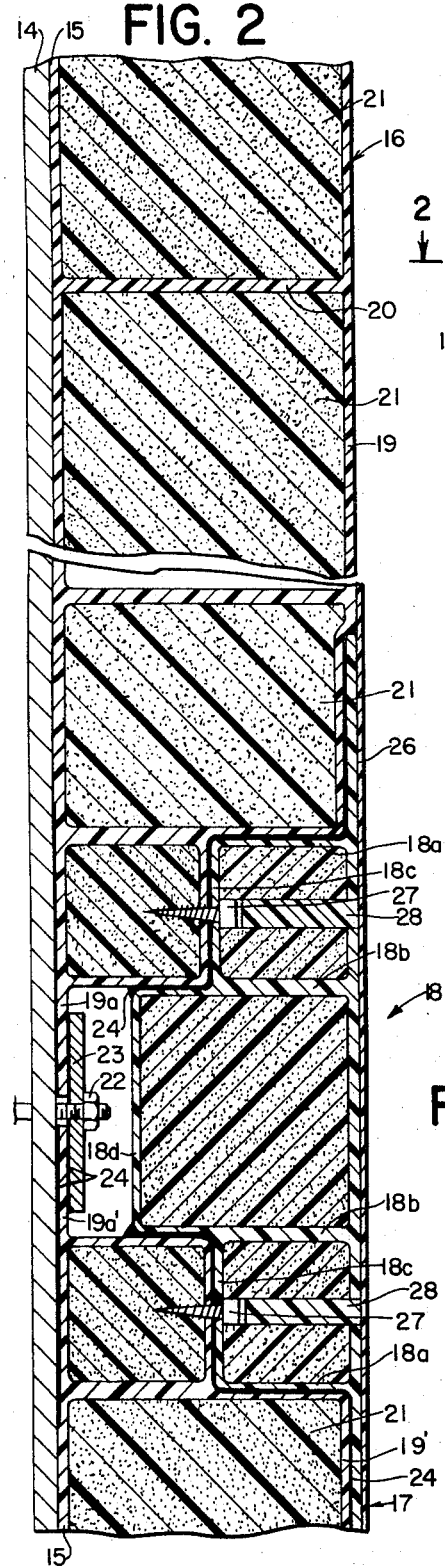
FIG. 2 is an enlarged cross sectional fragmentary view of an insulation panel arrangement taken in the direction of arrows 2—2 of FIG. 1.
Figure 3:
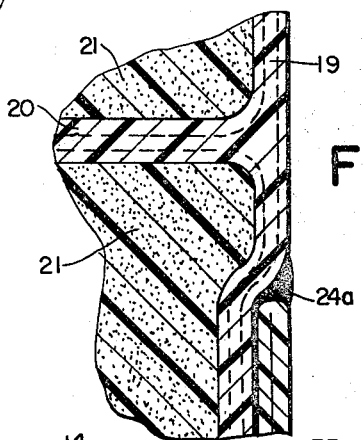
FIG. 3 is a fragmentary detailed cross section, further enlarged, of a portion of the joint between adjacent insulating panels shown in FIG. 2.

With reference initially to FIG. 2, adjacent to the inner hull 14 are arranged a series of panels, two of which, 16 and 17, have been indicated generally by respective reference numerals. Intermediate the panels 16 and 17 is a joint or plug assembly 18. The construction of each panel 16 or 17 consists essentially of a backing layer 15 adjacent to the steel inner hull 14, a cold face layer 19 and intermediate, transverse reinforcing webs 20. The layers 15, 19, and webs 20 encapsulate foam insulation 21 of a urethane material, for example. Webs 20 are spaced apart preferably, in the embodiment at one-foot intervals, forming in essence an extremely strong box-girder construction. The layers 15, 19, and webs 20 incorporate glass fiber which is impregnated with a thermosetting resin, such as unsaturated polyester resin, epoxy or the like, and then molded together with the urethane blocks of insulation. A glass fiber-to-resin proportion is used suitable to achieve the prerequisite resistance to stress imposed by thermal contraction forces at the particular temperature use for which the insulation system is designed. In other words, the glass fiber content in each case shall be sufficient for the stresses induced by temperature to prevent cracking or tearing of the glass fiber layers when restrained in the manner to be described. Furthermore, the relative strength of the webs 20 will be controlled to produce reinforcing of the respective layers 15 and 19 to enable these to withstand hydrostatic or other weight stress loads which might occur if the insulation system had to contain the liquefied hydrocarbons. Also, webs 20 and the box-girder construction mentioned will augment the overall rigidity of the panels to resist forces caused by thermal contraction.

Proceeding now to a more descriptive account of the panel-joint arrangement of FIG. 2, it will be observed that the cold faces 19 and 19' of the panels 16 and 17 form steps in the region of the joint 18 and faces 19 and 19' are carried through to lie adjacent to each other as indicated at 19a and 19a'. At this juncture (i.e., 19a and 19a'), faces 19 and 19' are secured to the steel inner hull 14 by the bolt 22 and clamp 23 and by a suitable adhesive 24, the latter respectively being applied behind panel flanges 19a, 19a' and clamp 23. It is important for proper consideration of the invention to realize that the cold layers or faces 19 and 19' may be subjected to temperatures in the order of −300° F., which greatly tend to contract or shrink the layers subjected to these temperatures. However, the temperature gradient from the cryogenic face through the insulation layer 21 to the glass fiber backing 15 and the inner hull 14 will normally be from extreme cold to ambient. This means that the inner hull 14 and backing layer 15 are not subjected to any contracting force due to cooling of these surfaces. Since the cold face layers 19 and 19' are directly connected to noncontracting structures 14 and 15 (by means of flanges 19a and 19a'), the cold face layers 19 and 19' are restrained from shifting laterally. As mentioned, the layers 19 and 19' themselves will have a sufficient glass-to-resin content that when secured as described, the tendency for shrinkage to occur of the layers 19 and 19' will be extremely minimal. The foam blocks 21 are molded as an integral part of the surrounding network of backing and facing layers 19 with intermediate webs 20 and, therefore, the minimum tendency of the layers 19 and 19' to shrink will be transmitted effectively to the foam insulation. This results in entirely preventing any cracking of the foam insulation barrier which otherwise would form fissures for the transmission of cold to the steel inner hull 14 and embrittlement and cracking thereof. In the steplike configuration at the edges of panels 16 and 17 the spacing of webs 20 is reduced to materially increase the strength of the panels to resist deformation and shrinkage of faces 19 and 19'.

The foam insulation will tend to shrink (or expand in the case of increasing temperature) greater than the glass fiber layer. The latter's tendency to shrink (or expand) is substantially eliminated by periodic anchoring of the glass fiber to nonshifting structure (hull 14), coupled with the inherent elasticity and high strength characteristics of glass fiber to absorb the stress loading of expansion and contraction forces. Also, the foam is segregated by the panel construction described into relatively short lengths to minimize a cumulative build-up of contraction or expansion forces by localization thereof. It is thus that periodic anchorage of the glass fiber layer subjected to contraction/expansion temperatures will place such layer in relative tension or compression with such forces induced therein ultimately counteracted by the anchorage points at the inner hull 14 (in the specific embodiment). A further point to be noted is that the disclosed construction comprises an insulation system completely contained, or boxed in, within a surrounding ambient rigid structure which consequently physically inhibits and dimensionally limits expansion or contraction of the inner contained insulation system.

As a further aspect of the invention, the plug or joint 18 has been designed for a twofold purpose; namely, to assist in reinforcing against lateral shifting of the cold face layers 19 and 19' and to seal the space between the adjacent panels 16 and 17. Accordingly, the joint 18 has corresponding steps matching those of the adjacent panels 16 and 17 which form in part an interlocking boxlike arrangement of webs 18a, 18b, and 18c at each side of the joint with a central larger box having a lower face 18d. The cryogenic face of the joint 18e extends beyond the major thickness of the adjacent panels 16 and 17 which are recessed to present an overall flush surface. Faying surfaces of the panels 16 and 17 and of the block 18 are coated with a suitable adhesive 24 such as an epoxy which acts as a seal. Such surfaces may be abraded as needed to assist bonding between the adhesive and glass fiber interface. As an additional precaution, an inner plastic sheet 26 is bonded to the panel members and the intermediate block and covers the inner joint lines 24a between these members. During assembly of the panels and block, a self-tapping screw 27 is fastened through the layers 18c of the joint and into the opposite facing layers of the panel members 16 and 17. Thereafter, cylindrical insulating plugs 28 are inserted to fill the bore provided for the screw.

It will be observed that the joint 18 is of extremely rigid construction and interlocks with the reinforced step/box construction of the adjacent panel structures to prevent any lateral shifting of the cold faces 19 and 19'. Therefore, these faces are truly directly secured and restricted at 19a and 19a' by the bolt and clamp combination 22 and 23.

Figure 4:
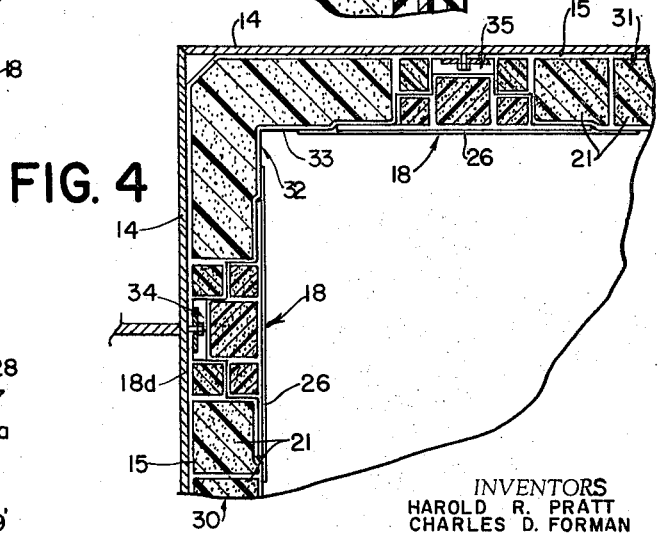
FIG. 4 is a corner section of the insulation system.

FIG. 4 illustrates a corner section of the insulation system wherein panel members 30 and 31, similar to panels 16 and 17, are bolted to the inner hull 14 as described. Joints 18 are provided which bridge the gaps between panels 30 and 31 and the molded corner 32. The latter also has its inner or cold face 33 bolted securely to the ambient, noncontracting structure as indicated at 34 and 35.

As mentioned, the joint and panel combination of FIG. 2 is constructed to comprise a liquid barrier against the passage of liquefied hydrocarbons through the joint area 18. In addition, the combined resin-glass construction of the layers 19 and 19' prevents substantial permeation of these layers by liquefied hydrocarbons such that the system as shown may function as a liquid barrier. Ordinarily, the insulation system as such may be used in combination with an inner tank container for the liquefied hydrocarbon material so that the liquid barrier feature will normally function only in the event that the inner container fails.

According to FIG. 7, therefore, the integrated insulation system contains a means for supporting an inner container 37 of aluminum, for example, which is equipped with mounting brackets 38 and 39, advantageously along the center line of each side thereof. The brackets 38 and 39 form keyways which each receive a key 40 formed by adjacent insulation panels and the backing or supporting structure of the inner hull 14. Panels 41 and 41' abut and 44 and 45 are connected by the joint 46. The inner sections 41a and 41a' of panels 41 and 41' are bolted to the hull 14 in the key area in a manner similar to that described. FIG. 8 shows in greater detail the internal reinforcing and construction of an intermediate section 41b' of panel 41' by means of webs 20'''. Sections 41b and 41b' are sandwiched between the inner hull 14 and outer plastic bearing sheets 47 and 47' which actually contact the inner surfaces of the brackets 38 and 39. According to the foregoing arrangement, the inner aluminum container 37 may contract toward or expand from the center of each side without disturbing the insulation system since such contracting movement is accommodated by relative movement between the bearing sheets 47 and 47' and the brackets 38 and 39.

The tanks 37 are supported upon a series of insulating panels and joints comprising the lower corresponding portion or floor of each cargo hold. FIG. 6 discloses a detail of the floor insulation layer consisting of an upper cold face 19'' with upright transverse webs 20''. The latter encapsulate separate glass fiber resin cores 48 which when laminated to the surrounding web structure 20'', provide great strength for supporting the overall weight of the tank 37''. It should be further noted that the web or transverse glass fiber members used as reinforcing elements throughout the various panel, joint and other constructions are essentially high insulating members. By comparison, for example, conduction of heat through aluminum and steel is approximately 1,500 times and 300 times as great, respectively.

It is the primary feature of the disclosed, integrated insulation system that thermal expansion or contraction of the system with its attendant disadvantages is almost entirely prevented. Individual units are, as described, so constructed and reinforced that shrinkage forces are opposed by stress loading the structures of the units themselves, which is accomplished by rigidly securing critical shrinkage areas to stable or nonshrinking structures. Thus, the disclosed system is an improvement over even monolithic inner and outer shell designs since these, although presenting a continuous cold inner shell which may shrink as a unit, nevertheless, do not prevent such shrinkage. Insulation located between such relatively moving shells must then be subjected to fracturing forces which may result in failure of the insulation barrier. Additionally, by preventing lateral shifting of the inner layer, leakage of liquid through the joint lines of the system is obviated. Finally, the integrated system as a whole is well able to withstand load stress imposed by the weight or hydrostatic pressure of the liquid whether contained in tanks internally of the system or in the event that such tanks should fail. Such loads will be great when it is realized that the cargo compartments of a tanker vessel may be of a size and order of magnitude of 100 feet long, 70 feet wide, and 50 feet deep.

It will be understood that the foregoing description relates to a particular embodiment of the invention and is, been more particularly described as a system for insulating liquids at cryogenic temperatures; however, as previously mentioned, such system should find application within the principles and construction of the invention for the insulation of materials throughout a broad range

What is claimed is:

1. An insulating panel comprising a relatively rigid backing layer, a relatively rigid facing layer adapted to withstand extremes of temperature, insulating material between said backing layer and said facing layer, a plurality of substantially parallel planar stiffening members intermediate and transversely joining said facing and backing layers for rigidly fixing the relationship of said layers with respect to each other, said stiffening members being of insulating material spaced apart throughout their length and extending substantially one full dimension of said panel to form a box-girder construction with said facing and backing layers with said insulating material encapsulated by said layers and stiffening members and bonded to said facing and backing layers and to said stiffening members, the peripheral portion of the facing layer extending toward said backing layer in covering relation to the edge of the insulating material with the terminal peripheral edge of the facing layer firmly secured to the backing layer whereby said facing layer remains relatively immobile when it is subjected to extremes of temperature.

2. In an structure, an integrated system of units for insulating liquids comprising in combination a plurality of insulating panels, each of said panels having a relatively rigid backing layer and a relatively rigid facing layer adapted to withstand extremes of temperature, a plurality of substantially parallel planar stiffening members of insulating material spaced apart throughout their length and extending substantially a full dimension of each panel to form a box-girder construction with said facing and backing layer, insulation material encapsulated by said layers and stiffening members and bonded to said facing and backing layers, and to said stiffening members, and means for firmly securing both of said layers to said structure whereby said facing layer remains relatively immobile when it is subjected to extremes of temperature, said facing layer being constructed to absorb without fracture tension and compression stress loading induced by temperature variations and to transmit such loading to said securing means.

3. The system of claim 2 wherein said facing layer is of glass-fiber reinforced-resin construction, the planar stiffening members comprise intermediate reinforcing transverse glass-fiber reinforced-resin webs and the facing layer is secured periodically at points adjacent to said backing layer.

4. The system of claim 2 which is installed in a vessel having outer and inner shells, wherein said facing layer extends to a position lying flat against said inner shell and is secured thereto by fastening means.

5. The system of claim 4 in which said facing layer extends in a series of steps to lie adjacent to said inner shell, each step being internally reinforced by longitudinal and transverse webs joining each step to said facing layer, adjacent panels define a joint area of steplike configuration, said joint being of corresponding mating steplike configuration overlying the steps of two adjacent panels and adhesively bonded each to the other, the steps of the joint having internally longitudinal and transverse webs joining each step to an inner face of the joint adjacent to said cold faces of the panels, said joint having at each side a flange overlying each adjacent panel along the facing layers thereof, said panels being recessed to receive the overlying flange to present a flush inner surface subjected to said extremes of temperatures.

6. The system of claim 5 in which each of said panels and said joints comprise combinations of glass-resin backing and facing layers having intermediate transverse glass-resin reinforcing webs, said layers and webs encapsulating plastic insulation material molded and bonded thereto, said joint being constructed as a series of blocks of glass-resin encapsulating insulation material to accommodate the steplike arrangement of the adjacent panels, whereby said joint interlocks rigidly with the adjacent panels in the joint area.

7. The system of claim 6 in which panels are molded at a corner as a single unit with opposite edges of the corner panel defining a joint area.

8. The system according to claim 6 in which a portion of said inner shell is constructed as an inwardly extending key at spaced relatively perpendicular locations, a series of panel and joint members are arranged in integrated fashion about the internal surfaces of said inner shell as a continuation of the key, bearing sheets transversely of the vessel cover the transverse surfaces of said panels which insulate the key, a separate container for liquids located internally of the insulation system, brackets mounted to said container along the center line of respective sides thereof for receiving each key formed by said inner shell and the insulation panels thereon, the interior sides of the brackets slideably engaging respective outer sides of said bearing sheets.

References Cited

UNITED STATES PATENTS

| | | | |
|---|---|---|---|
| 2,376,653 | 5/1945 | Boyer | 220—9 |
| 2,691,458 | 10/1954 | Dinwiddie | 220—9 |
| 2,744,042 | 5/1956 | Pace | 220—9 |
| 3,003,810 | 10/1961 | Kloote et al. | 220—9 |
| 3,079,026 | 2/1961 | Dosker | 220—9 |
| 3,082,726 | 3/1963 | Dosker | 114—74 |
| 3,099,362 | 7/1963 | Schlumberger | 220—9 |
| 3,112,043 | 11/1963 | Tucker | 220—15 |
| 3,150,797 | 9/1964 | Yamamoto | 220—15 |
| 3,158,383 | 11/1964 | Anderson et al. | 220—9 |
| 3,158,459 | 11/1964 | Guilhem | 220—15 |

THERON E. CONDON, *Primary Examiner.*

JAMES R. GARRETT, *Examiner.*